(12) United States Patent
Stevens

(10) Patent No.: US 7,185,189 B2
(45) Date of Patent: *Feb. 27, 2007

(54) METHOD OF STORING BIOS MODULES AND TRANSFERRING THEM TO MEMORY FOR EXECUTION

(75) Inventor: Curtis E. Stevens, Irvine, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/629,191

(22) Filed: Jul. 28, 2003

(65) Prior Publication Data

US 2004/0025003 A1 Feb. 5, 2004

Related U.S. Application Data

(63) Continuation of application No. 09/636,261, filed on Aug. 10, 2000, now Pat. No. 6,633,976.

(51) Int. Cl.
*G06F 9/00* (2006.01)
*G06F 9/24* (2006.01)
*G06F 1/24* (2006.01)

(52) U.S. Cl. .................. 713/2; 713/1; 713/100
(58) Field of Classification Search ............. 713/2, 713/1, 100
See application file for complete search history.

(56) References Cited

U.S. PATENT DOCUMENTS

| | | | | |
|---|---|---|---|---|
| 5,355,489 A | * | 10/1994 | Bealkowski et al. | ............ 713/2 |
| 5,522,076 A | * | 5/1996 | Dewa et al. | ................... 713/2 |
| 5,835,760 A | | 11/1998 | Harmer | |
| 6,546,489 B1 | * | 4/2003 | Frank et al. | ................. 713/187 |
| 6,633,976 B1 | * | 10/2003 | Stevens | ........................ 713/2 |
| 6,725,178 B2 | * | 4/2004 | Cheston et al. | ............. 702/186 |

* cited by examiner

*Primary Examiner*—Thomas Lee
*Assistant Examiner*—Ji H. Bae

(57) ABSTRACT

Methods for processing basic input output system (BIOS) modules of a computer to initialize the computer. The computer includes a system memory, a central processing unit (CPU), a computer bus, a critical nonvolatile storage device, and a secondary nonvolatile storage device. Selected BIOS modules required for operation of the computer are transferred from the critical nonvolatile storage device, and optionally a protected area of the secondary nonvolatile storage device, to system memory and executed to initialize the computer. Minimal BIOS initialization code is stored in a first portion of the critical nonvolatile storage device which is operative to initialize the CPU and the system memory. Additional BIOS modules are stored in the critical nonvolatile storage device or the protected area of the secondary nonvolatile storage device. A dispatch manager is stored in a second portion of the critical nonvolatile storage device. The dispatch manager is operative to selectively load and iteratively execute a predetermined number of tasks relating to initialization of the computer, which involves locating, loading and executing selected ones of the stored BIOS modules.

50 Claims, 4 Drawing Sheets

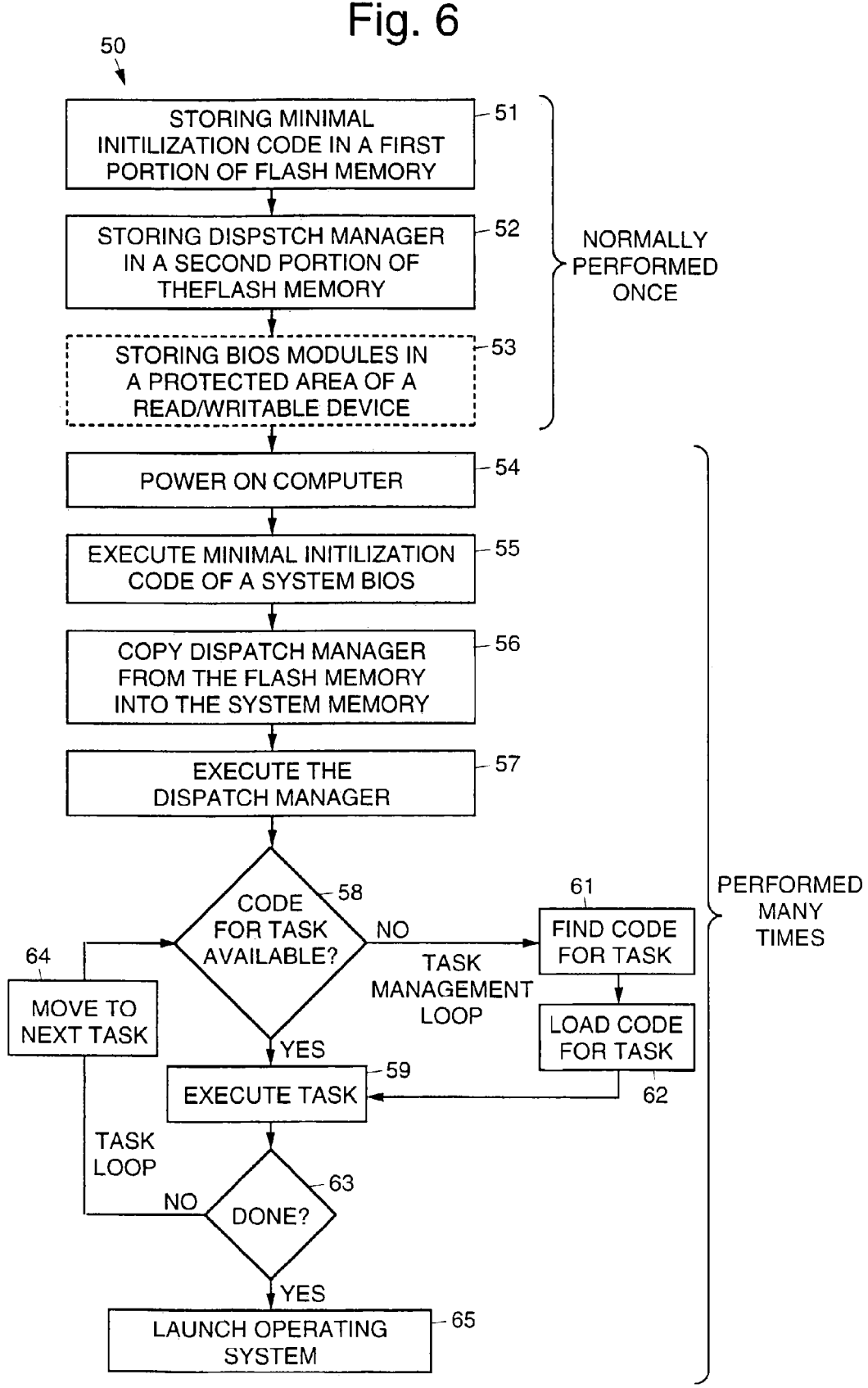

METHOD OF STORING BIOS MODULES AND TRANSFERRING THEM TO MEMORY FOR EXECUTION

This application is a continuation of application Ser. No. 09/636,261, filed on Aug. 10, 2000, which has matured into U.S. Pat. No. 6,633,976.

BACKGROUND

The present invention relates generally to computer systems and methods, and more particularly, to a method that may be used to store basic input output system (BIOS) modules of a computer in a protected area, transfer the BIOS modules to memory, and execute the BIOS modules to configure the computer.

A BIOS, or basic input output system, refers to a firmware program that is typically stored in nonvolatile memory (flash memory), and which brings up (initializes) a computer system when it is powered on. In conventional computer systems, the BIOS is typically loaded as a single block of code into random access memory (RAM) where it is accessed by the CPU of the computer system to operate the system.

Prior art hard disk drives are capable of safely storing firmware (BIOS) in a protected area on spinning media in a tightly integrated system. A tightly integrated system is one where components used for basic operation of the hard drive are interdependent. When the hard drive is a component of a larger system, typically no other firmware components can be safely stored on the hard drive. The protected area is referred to as a vendor protected area. The vendor protected area is typically reserved for firmware of the hard disk drive manufacturer. In general, a fixed area of less than one megabyte of hard disk space is reserved for the vendor protected area.

With regard to prior art specifically related to the present invention, U.S. Pat. No. 5,835,760 issued Nov. 10, 1998, entitled "Method and arrangement for providing BIOS to a host computer", discloses operation of a computer system having a host computer with system RAM. The host computer uses a BIOS to control the operation of the computer system, and requires the host computer to obtain the BIOS and store it in the system RAM. A first portion of the BIOS (initialization code) is stored in a read only memory (ROM) which is not a flash memory, and a second portion of the BIOS is stored in a protected area of a mass memory storage peripheral computer device (hard disk) rather than in ROM. It is stated that the second portion of the BIOS may be expansion BIOS associated with a particular peripheral computer device or system BIOS associated with the host computer.

In operation, as is stated in U.S. Pat. No. 5,835,760, the first portion of the BIOS (initialization code) is read out of the ROM into the host computer. The host computer executes instructions contained in the first portion of the BIOS and reads the second portion of the BIOS (i.e., the entire BIOS) from the protected area of the hard disk drive into the system RAM. The second portion of the BIOS is executed to operate peripheral computer devices or the computer.

U.S. Pat. No. 5,835,760 does not disclose or suggest the use of a flash memory or nonvolatile memory, and does not disclose or suggest storing any portion of the BIOS in a flash memory. Furthermore, U.S. Pat. No. 5,835,760 does not disclose or suggest selectively transferring modules of the BIOS into RAM, only the entire BIOS associated with the peripheral computer devices or the computer.

It is an objective of the present invention to provide for improved methods that may be used to store basic input output system (BIOS) modules of a computer in a protected area, transfer the BIOS modules to memory, and execute the BIOS modules to configure the computer. The present invention is an improvement over the teachings of U.S. Pat. No. 5,835,760.

SUMMARY OF THE INVENTION

To accomplish the above and other objectives, the present invention provides for methods that process basic input output system (BIOS) modules of a computer to initialize a computer. The methods store basic input output system (BIOS) modules of the computer in a protected area, transfer the BIOS modules to system memory, and execute the BIOS modules to configure the computer. The computer includes a system memory, a central processing unit (CPU), a computer bus, a critical nonvolatile storage device and optional secondary nonvolatile storage device(s). Selected BIOS modules required for operation of the computer are transferred from the critical nonvolatile storage device, and optionally the protected area of the secondary nonvolatile storage device, to system memory, and are executed to initialize the computer.

The critical nonvolatile storage device may be flash memory, read only memory (ROM), programmable read only memory (PROM), erasable programmable read only memory (EPROM), or electrically erasable programmable read only memory (EEPROM), or other device or technology that the CPU may use to execute an initial set of instructions. The secondary nonvolatile storage device may be a hard disk drive, a compact disk (CD) drive, a digital video disk (DVD) drive, a floppy disk drive, a Zip drive, a SuperDisk drive, a Magneto-Optical disk drive, a Jazz drive, a high density floppy disk (HiFD) drive, flash memory, read only memory (ROM), programmable read only memory (PROM), erasable programmable read only memory (EPROM), or electrically erasable programmable read only memory (EEPROM), or any other device capable of preserving data in the event of a power-off condition.

The basic input output system (BIOS) is firmware that is typically stored in solid state non-volatile memory. The present invention allows multiple CPUs and system devices to be initialized from firmware (BIOS) stored on non-solid state system resources. The present invention allows the system to safely store and reliably retrieve firmware from a non-solid state device.

In one embodiment of the present invention, a minimal amount of BIOS initialization code is stored in a first portion of the critical nonvolatile storage device. The minimal initialization code is operative to initialize the CPU and the system memory. Additional BIOS modules are stored in the critical nonvolatile storage device or a protected area of the secondary nonvolatile storage device. A dispatch manager is stored in a second portion of the critical nonvolatile storage device. The dispatch manager is operative to selectively load and iteratively execute a predetermined number of tasks relating to complete initialization of the computer.

After the computer is turned on, the minimal initialization code is executed to initialize the CPU and the system memory. The dispatch manager is copied from the critical nonvolatile storage device to the system memory. The dispatch manager sequentially executes the predetermined number of tasks to initialize the computer.

The plurality of BIOS modules that are operative to control operation of the computer may be stored in a protected area of the critical nonvolatile storage device. The dispatch manager executes to sequentially copy selected BIOS modules identified in its list of tasks to execute. These BIOS modules are copied from the protected area of the secondary nonvolatile storage device to the system memory and are then executed.

The dispatch manager may also operate to determine which BIOS modules are required for operation of the computer and determine if a required BIOS module is stored in the system memory. If the required BIOS module is stored in memory, then the dispatch manager executes the stored BIOS module. However, if the required BIOS module is not in memory, then the dispatch manager copies the required BIOS module from the secondary nonvolatile storage device to the system memory and then executes the copied BIOS module. The dispatch manager repeats this procedure until all required BIOS modules are copied and executed. Once all of the required BIOS modules are copied into the system memory and executed, the operating system of the computer is launched and normal computer operation ensues.

The present invention thus allows system firmware (BIOS) to be stored on nonvolatile storage devices that are loosely integrated with the system. The basis of this operation is the ability to create a protected area on the nonvolatile storage device. In a hard disk environment, this protected area is distinct from the vendor-protected area discussed previously. This protected area can be accessed by the system firmware (the minimal initialization BIOS code), and BIOS modules required for the system are read from the protected area into system memory. The nonvolatile storage device denies all other access to the protected area allocated to the BIOS.

Heretofore, no computer or BIOS manufacturer has stored initialization BIOS in a first portion of a nonvolatile storage device which is executed to load a dispatch manager from a second portion of the nonvolatile storage device into system memory which is subsequently used to copy individual BIOS modules stored in a protected area and execute the copied individual BIOS modules to initialize the computer.

As was mentioned above, conventional hard disk drives include a hidden vendor-protected area where hard drive firmware is stored. However, in another embodiment of the present invention, the secondary nonvolatile storage device, and in particular a hard disk drive, is configured to have a second hidden protected area where the BIOS modules are stored. This BIOS module storage area is distinct from the vendor-protected area normally found on hard disk drives.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 6 is a flow diagram that illustrates another exemplary method in accordance with the principles of the present invention that stores basic input output system (BIOS) modules of a computer in a protected area, transfers selected BIOS modules to system memorys and executes the modules.

DETAILED DESCRIPTION

Figure 1:
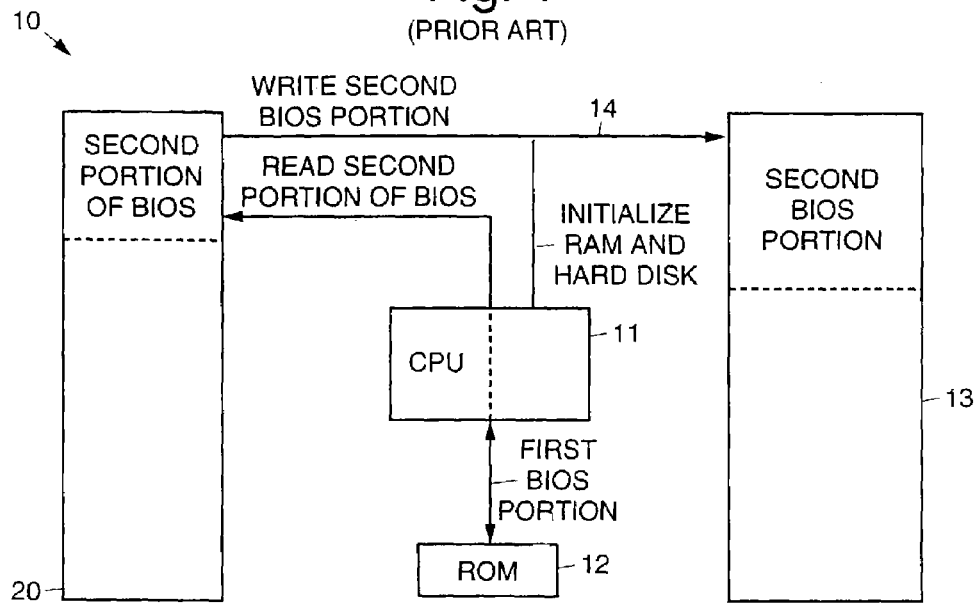
FIG. 1 illustrates an exemplary prior art computer system that implements conventional BIOS loading and execution.

Referring to the drawing figures, FIG. 1 illustrates a simplified block diagram of an exemplary prior art computer system 10 that implements conventional BIOS loading and execution. This computer 10 corresponds to the computer system disclosed in U.S. Pat. No. 5,835,760.

This computer 10 has a central processing unit (CPU) 11 that is coupled to a read only memory (ROM) 12. The CPU 11 is coupled to a system memory 13, such as a random access memory (RAM) 13. The CPU 11 is also coupled to a hard disk drive 20 by way of a system bus 14, such as a Peripheral Component Interconnect (PCI) bus 14, for example. The ROM 12 stores initialization code that initializes the CPU 11, the system memory 13, the system bus 14, and the hard disk drive 20. A single piece of monolithic code comprising the basic input output system (BIOS) is stored in a protected area of the hard disk drive 20. This protected area is the vendor protected area discussed above.

A first portion of the BIOS (the initialization code) is stored in the ROM 12. A second portion of the BIOS (which a single monolithic block of code) is stored in a protected area of the hard drive disk 20. In operation, the initialization code is read out of the ROM 12 by the CPU 11. The CPU 11 executes instructions contained in the initialization code and reads the second portion of the BIOS (the entire BIOS) from the protected area of the hard disk drive 20 into the system RAM 13. The second portion of the BIOS is executed to operate peripheral computer devices or the computer 10.

Figure 2:
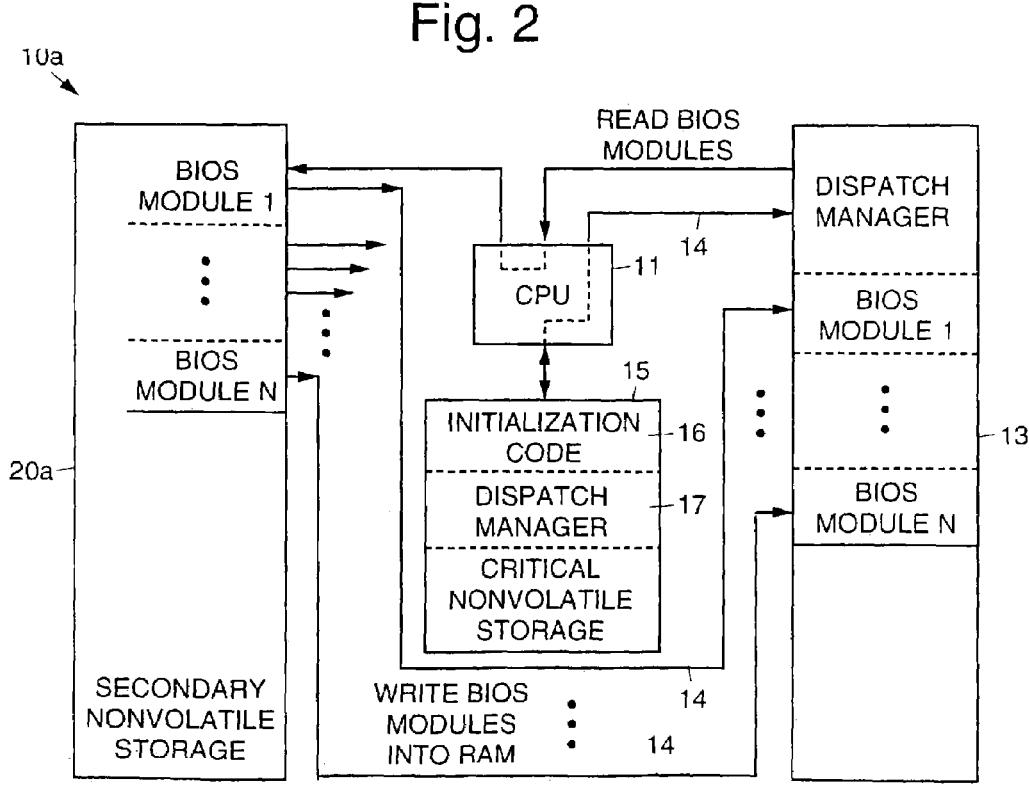
FIG. 2 illustrates a computer system that implements an exemplary method in accordance with the principles of the present invention that is used to store basic input output system (BIOS) modules of a computer in a protected area and transfer selected BIOS modules to system memory.

Referring to FIG. 2, it illustrates a computer 10a that implements an exemplary method 50 (FIG. 6) in accordance with the principles of the present invention. The method 50 is used to store basic input output system (BIOS) modules of the computer 10a (FIG. 3) in a protected area, transfer selected BIOS modules to system memory 13, and execute the selected BIOS modules.

The computer 10a comprises a central processing unit (CPU) 11 that is coupled to a critical nonvolatile storage device 15. The critical nonvolatile storage device 15 may be flash memory, a read only memory (ROM), a programmable read only memory (PROM), an erasable programmable read only memory (EPROM), an electrically erasable programmable read only memory (EEPROM), or other device or technology that the CPU 11 can use to execute an initial set of instructions.

The CPU 11 is also coupled to a system memory 13, such as a random access memory 13. The CPU 11 may be coupled to a secondary nonvolatile storage device 20a by way of a system bus 14, such as a Peripheral Component Interconnect (PCI) bus 14, for example. The secondary nonvolatile storage device 20a may be a hard disk drive, a compact disk (CD) drive, a digital video disk (DVD) drive, a floppy disk drive, a Zip drive, a SuperDisk drive, a Magneto-Optical disk drive, a Jazz drive, a high density floppy disk (HiFD) drive, flash memory, read only memory (ROM), programmable read only memory (PROM), erasable programmable read only memory (EPROM), electrically erasable programmable read only memory (EEPROM), or any other device or technology capable of preserving data in the event of a power-off condition.

A first portion of the critical nonvolatile storage device 15 stores initialization. code 16 that is operative to initializes the CPU 11 and the system memory 13. A second portion of the critical nonvolatile storage device 15 stores a dispatch manager 17 that contains a list of tasks, which must execute to fully initialize the computer 10a. The dispatch manager 17 is operative to selectively load and iteratively execute a number of tasks relating to complete initialization of the computer.

In operation, when the computer 10a is turned on, the initialization code 16 is run to initialize the CPU 11 and the system memory 13. The dispatch manager 17 is then loaded into the system memory 13. The dispatch manager 17 executes the list of tasks contained therein to cause all required BIOS modules to be loaded into the system memory 13 and must be executed.

The dispatch manager 17 determines whether each required BIOS module is in the system memory 13, and if it is not, find, loads and executes each required BIOS module. The BIOS module may be located in the critical nonvolatile storage device 15 (flash memory) or in the secondary nonvolatile storage device 20a, including any of the critical or secondary nonvolatile storage devices 20a identified above.

Figure 3:
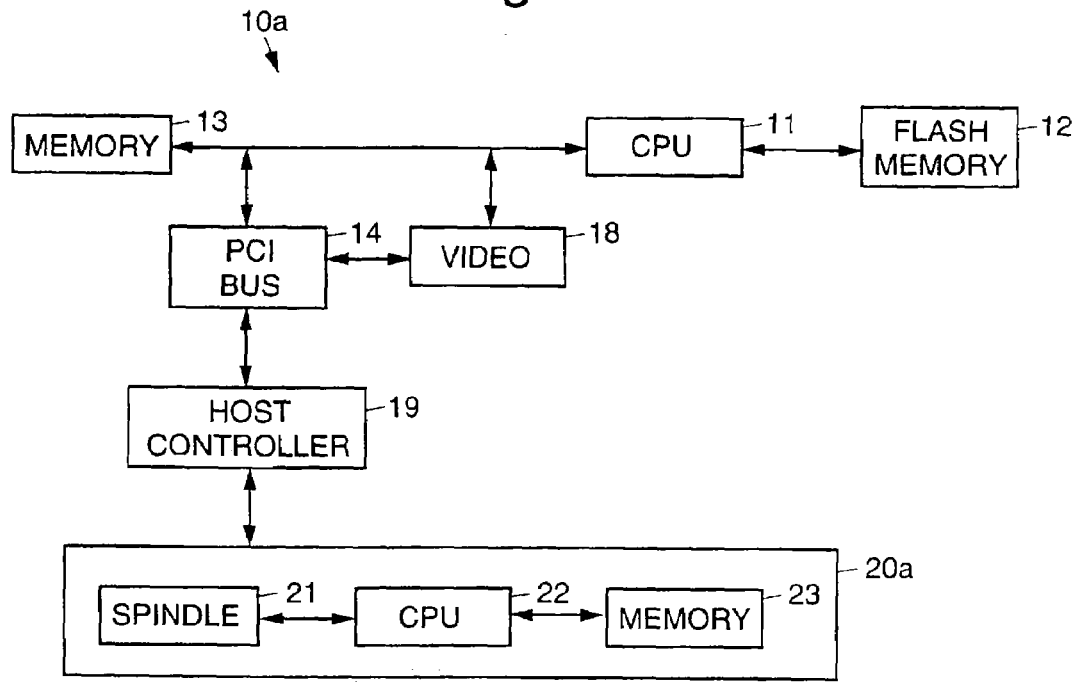
FIG. 3 illustrates details of the computer system shown in FIG. 2.

FIG. 3 illustrates details of the computer system 10a shown in FIG. 2. The computer system 10a is shown comprising the central processing unit (CPU) 11, the flash memory 12, and the system memory 13. The CPU 11 is coupled to the secondary nonvolatile storage device 20a by way of a system bus 14, such as a Peripheral Component Interconnect (PCI) bus 14, for example. A video controller 18 is coupled to the system bus 14 and to the system memory 13. A host controller 19 is coupled between the PCI bus 14 and to the secondary nonvolatile storage device 20a. A secondary nonvolatile storage device 20a implemented as a hard disk drive 20a may be an IBM DJNA-371350 ATA hard disk drive 20, for example. The hard disk drive 20a comprises a spindle 21, which is coupled to a central processing unit (CPU) 22 having a volatile memory 23.

Figure 4:
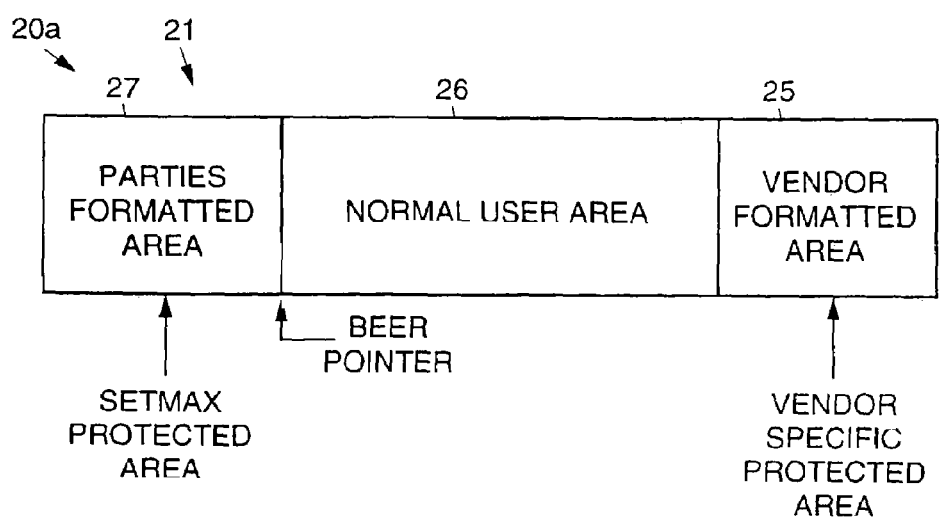
FIG. 4 illustrates a layout of an exemplary hard disk drive implemented in accordance with the principles of the present invention.

FIG. 4 illustrates a layout of an exemplary hard disk drive 20a implemented in accordance with the principles of the present invention. The media of the hard disk drive 20a is broken up into three distinct areas. The first is a vendor protected area 25. The vendor protected area 25 is typically reserved for firmware of the manufacturer of the hard disk drive 20a. In general, a fixed area of less than one megabyte of hard disk space is reserved for the vendor protected area 25.

In accordance with the present invention, a second protected area 27 of the hard disk drive 20 (the secondary nonvolatile storage device 20a), which may be referred to as a BIOS protected area 27, contains a plurality of individual BIOS modules for the computer 10a. The BIOS protected area 27 may be created on the hard disk drive 20a using NCITS D1367 (PARTIES), NCITS D1321 (ATA/ATAPI-5), and NCITS D996(SCSI-3 Block Commands) specifications.

The PARTIES specification specifies how to organize data on the secondary nonvolatile storage device 20a. The ATA/ATAPI-5 and SCSI-3 Block Commands provide a means to create a protected space on the secondary nonvolatile storage device 20a. As will be described below with reference to FIG. 5, the present invention combines these capabilities to create the BIOS protected area 27 on the secondary nonvolatile storage device 20a (such as in the hard disk drive 20a) to store a plurality of individual BIOS modules. Selected BIOS modules are read from the BIOS protected area 27 on the secondary nonvolatile Storage device 20a into the system memory 13 and executed using the method 50 (FIG. 6) of the present invention to initialize the computer 10a.

The following is presented to better understand the PARTIES specification and its use in implementing the present invention. Protected Area Run-Time Interface Extensions Services (PARTIES) technology allows a system to reserve space on a hard drive for system use. This space is divided into segments via a Boot Engineering Extension Record (BEER). The individual segments can be used for data storage or for booting a fail-safe operating system.

When the system boots normally, the reserved space is inaccessible, and thus is protected from viruses, and unknowledgeable users, and the like. In one embodiment, if a user elects to perform a fail-safe boot using MS-DOS, drive letters C: and above operate the way they normally would during a standard boot. The difference is that the system boots from drive A: instead of C:, where drive A: is simulated from one of the PARTIES segments. This capability has several applications including system diagnosis, recovery, and fail-safe applications.

In one implementation, there are four distinct software layers involved in using PARTIES. A Discovery layer detects the presence of PARTIES on the hard drive. A Boot Selection layer provides a user with the ability to choose the fail-safe boot service. A Simulation layer provides simulation services including drive A: from a reserved area on the hard drive when the user chooses to fail-safe boot the system. A Manipulation layer provides a way to create, delete and access PARTIES services. The ANSI PARTIES specification provides the specific details for formatting and finding PARTIES services.

In one implementation, during the discovery process, the BIOS checks all drives for the presence of a BEER sector. If a BEER sector is present, then the drive has PARTIES services available. If no BEER sectors are present then all PARTIES capability is disabled.

If fail-safe boot services are found during the discovery process, the user must be provided with methods to select a boot service. One implementation is as follows: (1) Integration with Phoenix Technologies MultiBoot 3 capability, and (2) Hotkey.

MultiBoot 3 provides two methods for boot selection. The first method is in SETUP, and the second method is via a hotkey during power on self test (POST). When PARTIES technology is present, the user is presented with a new option, Fail-Safe boot. When the user selects this option, a menu of boot services is displayed, using a MultiBoot 3 menu format.

In the case of a hotkey, the selected service is then booted. An OEM may wish to extend the system capabilities by providing buttons, or adding hotkeys, to trigger specific applications. Applications include compact disk (CD) control panels, System Diagnostics, and browsers. Another method of choosing a service to boot could involve a watchdog timer. If the primary OS fails to boot, the watchdog timer triggers and a failsafe boot is automatically performed. Still another method could involve adding buttons to the system. When a specific button is pressed the system automatically boots a specific failsafe service area. Still another possibility involves a touchpad or mouse. The user graphically selects a service area for the next boot.

After the user chooses to boot using PARTIES services, an INT 13 level simulation is invoked. A SETMAX command is issued to the drive that exposes the entire service area, but leaves other service areas, further out on the drive, protected. Details of the simulation can be found in the ANSI PARTIES specification.

There are several possibilities for manipulating the PARTIES area. Firstly, a DOS-based tool can initialize the BEER sector as well as add and delete PARTIES services. Secondly, BIOS-based PARTIES services can be accessed from the BIOS SETUP utility as well as at run-time. The SETUP utility could allow the user to explicitly initialize create and delete BEER sectors and PARTIES services.

In a typical computer, the BIOS uses precious flash memory and CMOS memory to store non-volatile variables. In some BIOS implementations this can be 4 k of memory or more. Furthermore, non-essential or non-differentiated BIOS modules such as those that are associated with operating system runtime functions such as BIOS Runtime Services and ACPI modules are also typically stored in either flash memory and CMOS memory. The present invention moves the storage location of these non-essential or non-differentiated BIOS modules to the secondary nonvolatile storage device 20a, such as the hard disk drive 20a, for example.

With reference to FIG. 4, it illustrates an exemplary layout of hard disk media 21 implemented in accordance with the principles of the present invention. Using the SETMAX command defined in the ATA/ATAPI-5 specification and the teachings of the PARTIES specification, a disk (media 21) layout illustrated in FIG. 4 may be created.

The hard disk media 21 of the hard disk drive 20a is configured in accordance with the principles of the present invention to have a PARTIES formatted area 27, a normal user area 26, and a vendor-protected area 25. The vendor-protected area 27 is protected from access by anyone but the manufacturer or vendor of the hard disk drive 20a. The normal user area 26 is used to store files and applications by the user in a normal fashion when using the computer 10a. The PARTIES formatted area 27, of BIOS protected area 27, stores a plurality of nonessential BIOS modules as was discussed above. These nonessential BIOS modules are read into system memory 11 as required by the dispatch manager 17 to set up the computer 10a for operation.

The BIOS retrieves information from the PARTIES formatted area 25 and uses the retrieved information to configure the system. The information stored in the PARTIES formatted area 25 can include option ROMs, BIOS utilities, or other data required to operate the computer 10a. In addition, the BIOS may use the PARTIES formatted area 27 to store variables in the same way that variables are stored in the critical nonvolatile storage device 15.

Figure 5:
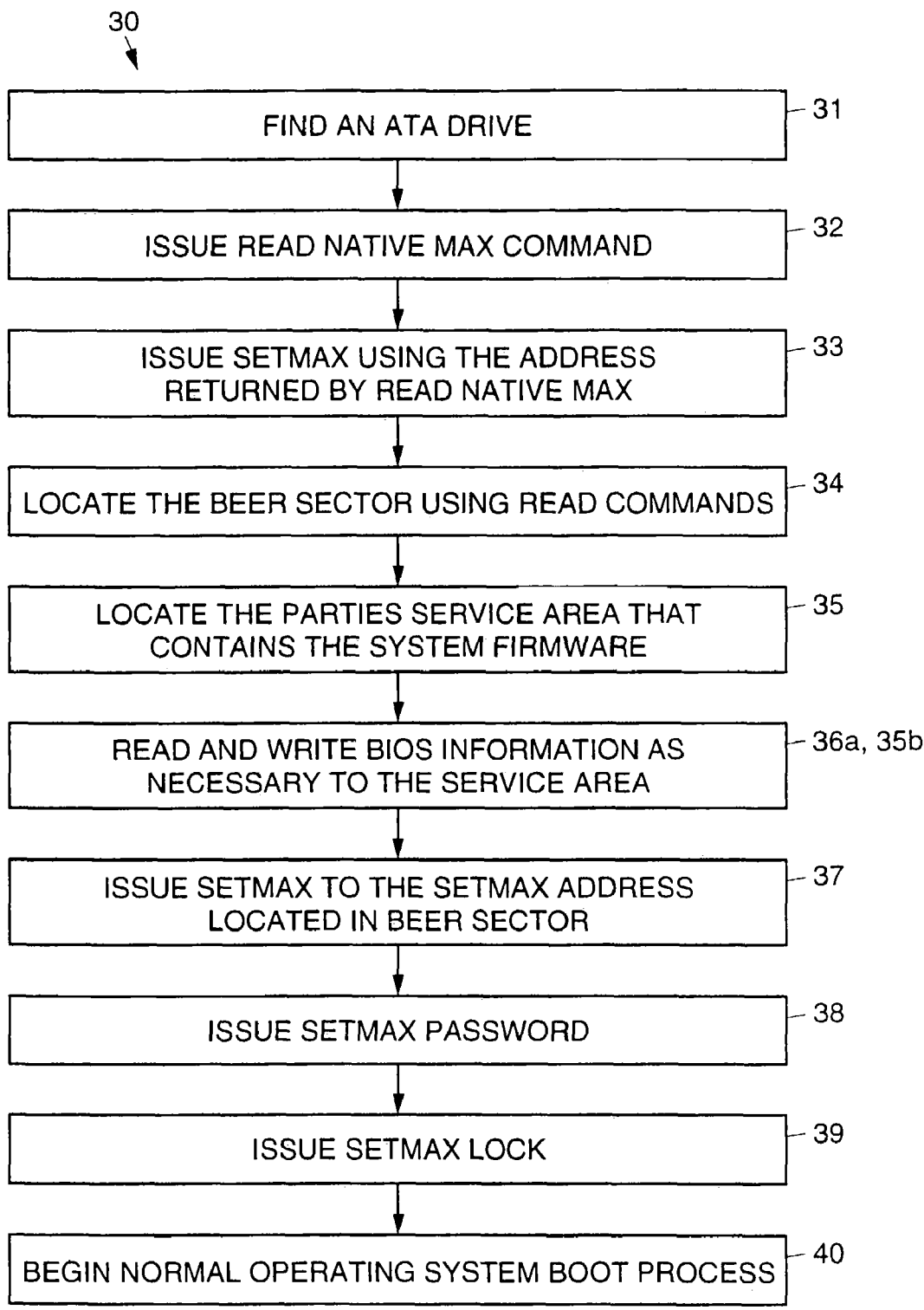
FIG. 5 is a flow diagram illustrating one exemplary method in accordance with the principles of the present invention that may be used to protect BIOS modules in a secondary nonvolatile storage device.

By way of example, in a computer system 10a with an ATA hard drive 20a as the secondary nonvolatile storage device 20a, for example, the procedure illustrated in FIG. 5 may be used to protect the BIOS modules. More particularly, FIG. 5 is a flow diagram that illustrates an exemplary method 30 in accordance with the principles of the present invention that may be used to protect BIOS modules in a secondary nonvolatile storage device 20a. The method 30 comprises the following steps.

A secondary nonvolatile storage device 20a such as an ATA hard disk drive 20a, for example, is located 31. A READ NATIVE MAX command is issued 32 which returns the largest size of the ATA hard disk drive. A SETMAX command is issued 33 using the address returned by the READ NATIVE MAX command, which sets the size of the drive. A BEER sector (pointer) is located 34 using READ commands, which is in the last sector of the hard disk drive.

A PARTIES service area on the hard disk drive that contains system firmware is located 35. BIOS information is read from 36a and written to 36b the PARTIES service area as necessary. A SETMAX command is issued 37 to the SETMAX ADDRESS located in the BEER sector, which sets the size of the user area of the hard disk drive. A SETMAX PASSWORD command is issued 38, which is a random number that changes every boot. A SETMAX LOCK command is issued 39 which allows no more SETMAX commands to be issued.

The normal operating system boot process is then initiated 40. The steps described above prevent unauthorized access to the PARTIES area by anything except the system firmware.

FIG. 6 is a flow diagram that illustrates an exemplary method 50 in accordance with the principles of the present invention that is used to store basic input output system (BIOS) modules of a computer 10a in a protected area, transfer selected BIOS modules to system memory 11 and execute the transferred BIOS modules. The method 50 comprises the following steps.

Minimal initialization code 16 corresponding to a small portion of the computer system BIOS is stored 51 in a first portion of a critical nonvolatile storage device 15. A dispatch manager 17 containing a plurality of tasks relating to configuring the computer 10a is stored 52 in a second portion of the critical nonvolatile storage device 15. A plurality of BIOS modules are stored 53 in a protected area of a secondary nonvolatile storage device. The secondary nonvolatile storage device may comprise a hard disk drive, a compact disk ROM, a flash memory, a floppy disk drive, a Zip drive, or a SuperDisk drive, for example.

The computer 10a is turned on 54. The minimal initialization code is executed 55. The dispatch manager 17 is copied 56 from the critical nonvolatile storage device 15 into the system memory 11. The dispatch manager 17 is executed 57. The dispatch manager 17 sequences through the plurality of tasks relating to configuring the computer 10a to determine 58 if the task is stored in the system memory 11. If the task is stored in the system memory 11, then the task is executed 59. The execute task step 59 may in fact load data and/or instructions from the secondary non-volatile storage device 20a as a result of executing the task. If the task is not stored in the system memory 11, the dispatch manager 17 finds 61 the code for the task and loads 62 the code for the task in the system memory 11. Once the task is loaded in the system memory 11, the task is executed 59. The dispatch manager 17 iterates 64 through all tasks in the list of tasks until all tasks are loaded and executed. Once all tasks are loaded 63 the operating system of he computer 10a is launched 65.

Thus, methods for storing basic input output system (BIOS) modules of a computer in a protected area, transferring the BIOS modules to memory, and executing the BIOS modules to configure the computer have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A computer program product comprising: a computer usable medium having computer program code embodied therein to process basic input output system (BIOS) modules of a computer, said computer having a central processing unit (CPU), a system memory and a nonvolatile storage device, the computer usable medium having:
   computer readable program code for storing a predetermined amount of BIOS initialization code in a first portion of the nonvolatile storage device;
   computer readable program code for storing a dispatch manager in a second portion of the nonvolatile storage device that is operative to selectively load and iteratively execute a predetermined number of tasks relating to initialization of the computer;
   computer readable program code for executing the predetermined amount of BIOS initialization code to initialize the CPU and the system memory;
   computer readable program code for copying the dispatch manager from the nonvolatile storage device to the system memory; and
   computer readable program code for executing the dispatch manager to execute the predetermined number of tasks to initialize the computer.

2. The computer program product recited in claim 1 wherein the computer further comprises a secondary nonvolatile storage device, and wherein the computer usable medium further comprises:
   computer readable program code for storing a plurality of BIOS modules in a module protected area of the secondary nonvolatile storage device that are operative to control operation of the computer; and
   computer readable program code for executing the dispatch manager to sequentially copy selected BIOS modules from said protected area of the secondary nonvolatile storage device to the system memory, and execute the selected BIOS modules in the system memory.

3. The computer program product recited in claim 2 wherein the computer readable program code for executing the dispatch manager comprises computer readable program code for:
   (a) determining one or more BIOS modules that are required for operation of the computer;
   (b) determining if a required BIOS module is stored in the system memory;
   (c) executing the required BIOS module if the required BIOS module is in memory;
   (d) copying the required BIOS module from the secondary nonvolatile storage device to the system memory if the required BIOS module is not in memory, and executing the required BIOS module after said copying; and
   (e) repeating (b)–(d) until said one or more BIOS modules have been executed.

4. The computer program product of claim 2 wherein the computer readable program code for executing the dispatch manager comprises computer readable program code for:
   (a) determining one or more BIOS modules that are required for operation of the computer;
   (b) determining if a required BIOS module is stored on the secondary nonvolatile storage device;
   (c) copying the required BIOS module from the secondary nonvolatile storage device to the system memory;
   (d) executing the required BIOS module after said copying; and
   (e) repeating (b)–(d) until said one or more BIOS modules have been copied from the secondary nonvolatile storage device to the system memory and executed.

5. The computer program product of claim 2 wherein the secondary nonvolatile storage device comprises a hard disk drive.

6. The computer program product of claim 5 wherein the hard disk drive comprises a vendor protected area, a user area and said protected area.

7. The computer program product of claim 2 wherein the protected area comprises a formatted area created using Protected Area Run-Time Interface Extensions Services (PARTIES) technology.

8. The computer program product of claim 2 wherein the secondary nonvolatile storage device comprises a compact disk ROM.

9. The computer program product of claim 2 wherein the secondary nonvolatile storage device comprises a flash memory.

10. The computer program product of claim 2 wherein the secondary nonvolatile storage device comprises a floppy disk drive.

11. The computer program product of claim 2 wherein the secondary nonvolatile storage device comprises a Zip drive.

12. The computer program product of claim 2 wherein the secondary nonvolatile storage device comprises a SuperDisk drive.

13. The computer program product of claim 3 wherein the computer usable medium further includes computer readable program code for launching an operating system of the computer after said one or more BIOS modules are copied to the system memory and executed.

14. A system for processing basic input output system (BIOS) modules comprising:
   a processor;
   a nonvolatile storage device coupled to the processor; and
   a memory coupled to the processor, said memory containing instruction sequences which, when executed by the processor, cause the processor to:
   store a predetermined amount of BIOS initialization code in a first portion of the nonvolatile storage device that is operative to initialize the processor and a system memory,
   store a dispatch manager in a second portion of the nonvolatile storage device that is operative to selectively load and iteratively execute a predetermined number of tasks relating to complete initialization,
   execute the predetermined amount of BIOS initialization code to initialize the processor and the system memory,
   copy the dispatch manager from the nonvolatile storage device to the system memory, and
   execute the dispatch manager to execute said predetermined number of tasks.

15. The system of claim 14 wherein the system further comprises a secondary nonvolatile storage device, and wherein the memory further includes instruction sequences that, when executed, cause the processor to:
   store a plurality of BIOS modules in a protected area of the secondary nonvolatile storage device that are operative to control operation of the system; and
   execute the dispatch manager to sequentially copy selected BIOS modules of said plurality of BIOS modules from the protected area of the secondary nonvolatile storage device to the system memory, and execute the selected BIOS modules in the system memory.

16. The system of claim 15 wherein said instruction sequences to cause the processor to execute the dispatch manager includes instruction sequences to cause the processor to:
(a) determine one or more BIOS modules that are required for operation of the system;
(b) determine if a required BIOS module is stored in the system memory;
(c) execute the required BIOS module if the required BIOS module is in memory;
(d) copy the required BIOS module from the secondary nonvolatile storage device to the system memory if the required BIOS module is not in memory, and thereafter execute the required BIOS module; and
(e) repeat (b) though (d) until all required BIOS modules are executed.

17. The system of claim 15 wherein said instruction sequences to cause the processor to execute the dispatch manager includes instruction sequences to cause the processor to:
(a) determine one or more BIOS modules that are required for operation of the system;
(b) determine if a required BIOS module is stored on the secondary nonvolatile storage device;
(c) copy the required BIOS module from the secondary nonvolatile storage device to the system memory;
(d) execute the copied BIOS module; and
(e) repeat (b) through (d) until said one or more required BIOS modules are copied from the secondary nonvolatile storage device to the system memory and executed.

18. The system of claim 15 wherein the secondary nonvolatile storage device comprises a hard disk drive.

19. The system of claim 18 wherein the hard disk drive comprises a vendor protected area, a user area and the protected area.

20. The system of claim 15 wherein said protected area comprises a formatted area created using Protected Area Run-time Interface Extensions Services (PARTIES) technology.

21. The system of claim 15 wherein the secondary nonvolatile storage device comprises a compact disk ROM.

22. The system of claim 15 wherein the secondary nonvolatile storage device comprises a flash memory.

23. The system of claim 15 wherein the secondary nonvolatile storage device comprises a floppy disk drive.

24. The system of claim 15 wherein the secondary nonvolatile storage device comprises a Zip drive.

25. The system of claim 15 wherein the secondary nonvolatile storage device comprises a SuperDisk drive.

26. The system of claim 15 wherein said memory further includes instruction sequences to cause the processor to launch an operating system after said one or more required BIOS modules are coupled to the system memory and executed.

27. A method for processing basic input output system (BIOS) modules of a computer having a processor, a system memory, a nonvolatile storage device and a secondary nonvolatile storage device, the method comprising:
storing a predetermined amount of BIOS initialization code in a first portion of the nonvolatile storage device;
storing a dispatch manager in a second portion of the nonvolatile storage device;
storing a BIOS module in a protected area of the secondary nonvolatile storage device, wherein said protected area is accessible only by system firmware of said computer;
executing said predetermined amount of BIOS initialization code to initialize the processor and the system memory;
copying the dispatch manager from the nonvolatile storage device to the system memory; and
executing the dispatch manager to copy the BIOS module from the protected area of the secondary nonvolatile storage device to the system memory, and execute said BIOS module in the system memory.

28. The method recited in claim 27, wherein executing the dispatch manager comprises:
(a) determining one or more BIOS modules that are required for operation of the computer;
(b) determining if a required BIOS module of said one or more BIOS modules is stored in the system memory;
(c) executing the required BIOS module if the required BIOS module is in said system memory;
(d) copying, when the required BIOS module is not in system memory, the required BIOS module from the secondary nonvolatile storage device to the system memory, and executing the required BIOS module after said copying; and
(e) repeating (b) through (d) until all required BIOS modules are executed.

29. The method of claim 27 wherein executing the dispatch manager comprises:
(a) determining one or more BIOS modules that are required for operation of the computer;
(b) determining if a required BIOS module of the one or more BIOS modules is stored on the secondary nonvolatile storage device;
(c) copying the required BIOS module from the secondary nonvolatile storage device to the system memory;
(d) executing the required BIOS module after said copying; and
(e) repeating (b) through (d) until said one or more BIOS modules have been copied from the secondary nonvolatile storage device to the system memory and executed.

30. The method of claim 27 wherein the secondary nonvolatile storage device comprises a hard disk drive.

31. The method of claim 30 wherein the hard disk drive comprises a vendor protected area, a user area and the protected area.

32. The method of claim 27 wherein the protected area comprises a formatted area based on an industry standard specification.

33. The method of claim 27 wherein the secondary nonvolatile storage device comprises a compact disk ROM.

34. The method of claim 27 wherein the secondary nonvolatile storage device comprises a flash memory.

35. The method of claim 27 wherein the secondary nonvolatile storage device comprises a floppy disk drive.

36. The method of claim 27 wherein the secondary nonvolatile storage device comprises a Zip drive.

37. The method of claim 27 wherein the secondary nonvolatile storage device comprises a SuperDisk drive.

38. The method of claim 28 further comprising launching an operating system of the computer after said one or more BIOS modules have been copied to the system memory and executed.

39. A system for processing basic input output system (BIOS) modules comprising:
a processor;
a nonvolatile storage device coupled to the processor; and a memory coupled to the processor, said memory containing instruction sequences which, when executed by the processor, cause the processor to:

store a predetermined amount of BIOS initialization code in a first portion of the nonvolatile storage device, store a dispatch manager in a second portion of the nonvolatile storage device, store a BIOS module in a protected area of a secondary nonvolatile storage device, wherein said protected area is accessible only by system firmware, execute the predetermined amount of BIOS initialization code to initialize the processor and the system memory, copy the dispatch manager from the nonvolatile storage device to the system memory, and execute the dispatch manager to copy the BIOS module from the protected area of the secondary nonvolatile storage device to the system memory, and execute said BIOS module in the system memory.

40. The system of claim 39 wherein the said instruction sequences to cause the processor to execute the dispatch manager includes instruction sequences to cause the processor to:
 (a) determine one or more BIOS modules that are required for operation of the system;
 (b) determine if a required BIOS module of said one or more BIOS modules is stored in the system memory;
 (c) execute the required BIOS module if the required BIOS module is in memory;
 (d) copy the required BIOS module from the secondary nonvolatile storage device to the system memory if the required BIOS module is not in memory, and thereafter execute the required BIOS module; and
 (e) repeat (b) through (d) until all required BIOS modules are copied and executed.

41. The system of claim 39 wherein said instruction sequences to cause the processor to execute the dispatch manager includes instruction sequences to cause the processor to:
 (a) determine one or more BIOS modules that are required for operation of the system;
 (b) determine if a required BIOS module of said one or more BIOS modules is stored on the secondary nonvolatile storage device;
 (c) copy the required BIOS module from the secondary nonvolatile storage device to the system memory;
 (d) execute the copied BIOS module; and
 (e) repeat (b) through (d) until said one or more required BIOS modules are copied from the secondary nonvolatile storage device to the system memory and executed.

42. The system of claim 39 wherein the secondary nonvolatile storage device comprises a hard disk drive.

43. The system of claim 42 wherein the hard disk drive comprises a vendor protected area, a user area and the protected area.

44. The system of claim 39 wherein said protected area comprises a formatted area created based on an industry standard specification.

45. The system of claim 39 wherein the secondary nonvolatile storage device comprises a compact disk ROM.

46. The system of claim 39 wherein the secondary nonvolatile storage device comprises a flash memory.

47. The system of claim 39 wherein the secondary nonvolatile storage device comprises a floppy disk drive.

48. The system of claim 39 wherein the secondary nonvolatile storage device comprises a Zip drive.

49. The system of claim 39 wherein the secondary nonvolatile storage device comprises a SuperDisk drive.

50. The system of claim 39, wherein said memory further includes instruction sequences to cause the processor to launch an operating system after all required BIOS modules are copied to the system memory and executed.

* * * * *